Nov. 29, 1938.   B. JABLONSKY   2,138,102
VEHICLE DIRECTION-INDICATOR
Filed May 25, 1934
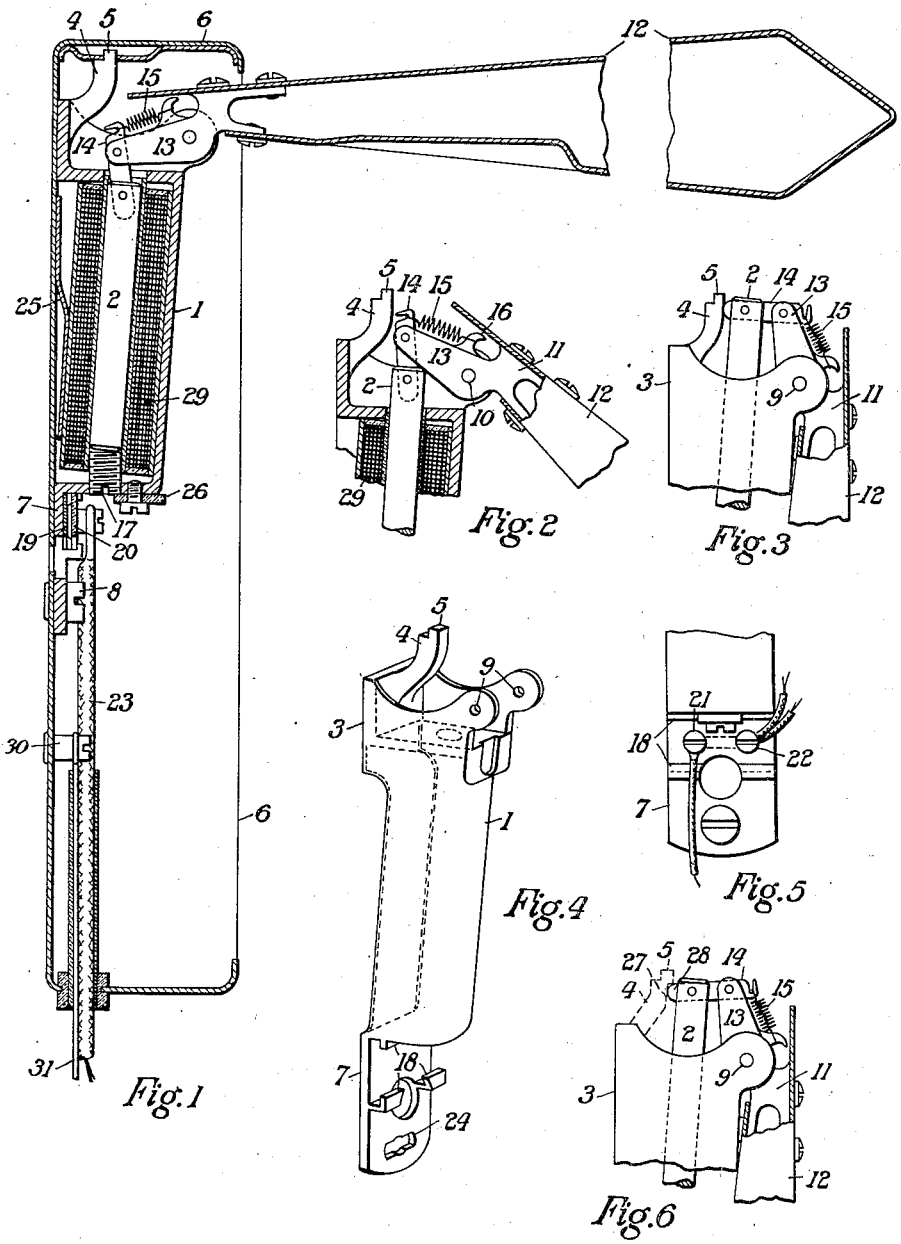
INVENTOR Patented Nov. 29, 1938

2,138,102

UNITED STATES PATENT OFFICE 2,138,102

VEHICLE DIRECTION-INDICATOR

Bruno Jablonsky, London, England, assignor to Trico-Folberth Limited, Brentford, Middlesex, England, a company of Great Britain Application May 25, 1934, Serial No. 727,489
In Great Britain May 30, 1933

5 Claims. (Cl. 177—329)

This invention relates to vehicle direction-indicators of the kind in which an indication of the direction in which a vehicle is going to turn is given by means of a pivoted semaphore arm which is caused to move from a normal, concealed, position of rest into a visible, signalling, position under the action of suitable power operating means, controlled by the driver of the vehicle. It is customary to mount a pair of such indicators, one on each side of the vehicle, for indicating, respectively, left and right hand turns, and to operate these indicators from a single, three-position, controlling device, arranged conveniently for operation by the driver of the vehicle.

This invention has reference, more particularly, to direction-indicators in which the semaphore arms are operated by electrical power electromagnetically by means of solenoids and plungers constituting their armatures, but as will be apparent to those skilled in the art, from a consideration of the detailed description hereinafter, certain features of this invention are equally applicable to direction-indicators which are operated pneumatically by suction, derived, in the case of vehicles driven by internal combustion engines, from the induction side of the engine, where, as is well-known, a suction exists while the engine is running.

The chief object of this invention is to effect, in semaphore direction-indicators, certain improvements in construction so as to simplify the same and render such indicators more susceptible of cheap manufacture on a large scale; at the same time, providing a sturdy construction having a correspondingly long useful life, with less liability to breakdown, and also a construction of few, easily-replaceable parts.

It has been found, in practice, that the semaphore arm when in its normal, concealed, position of rest is liable to rattle in its housing and and even swing outwards to some extent under the influence of extraneous forces produced by vibration of the vehicle on which the indicator is mounted. It is therefore customary practice in the art to provide some means for automatically holding the semaphore arm in its normal position against movement due to vibration, such anti-vibration holding means being arranged to be automatically released when the arm is operated by the power means provided.

Furthermore, in order to provide a compact device of neat appearance, it has been customary to arrange the operating mechanism for the semaphore arm within a housing provided with a slot for receiving and concealing the arm in its normal position. Thus, the operating mechanism is completely enclosed when the arm is in its normal position and can only be reached when the arm is swung out from the housing, as occurs when being operated to give a signal. Consequently, should the operating mechanism develop a fault and fail to function, it cannot be reached without dismantling the indicator damaging the parts by forcing them since the arm is held in normal, closed, position by the anti-vibration holding means above-mentioned. For this reason, and also in order to prevent damage to the parts of the device by ignorant attempts to raise the arm by hand when closed, it has been found desirable, in practice, to provide means whereby the holding means above referred to may be released independently of the operation of the operating mechanism by power. One proposal for this purpose has been to provide an anti-vibration holding means in the form of a resilient or yielding connection (in the form of a spring stop) between the semaphore arm and the plunger armature of a solenoid for operating the arm, such connection being arranged to be sufficiently unyielding to prevent movement of the arm by vibration, while yielding to force exerted by movement of the arm by hand, to thereby automatically release the holding means and permit such movement of the arm independently of operation by the solenoid. In actual use, however, it is found that such spring connection is unsatisfactory because of its liability to get out of order, for instance, by ingress of dirt, under which circumstance the semaphore arm often partly protrudes from its housing, instead of being completely concealed, and might therefore be mistaken for a signal.

A specific object of this invention, therefore, is to provide simple and effective anti-vibration holding means for the semaphore arm in its normal position which are readily releasable automatically by manual operation of the arm. A further object is to provide simple and efficient means for ensuring that the parts of the indicator are brought to their proper positions at the end of each movement of the arm by power means and, in particular, for ensuring that the arm is retained in its normal, concealed, position when not required for giving a signal. A feature of this invention consists in the provision of a spring which, while performing other functions, assists the power operating-means to operate the semaphore arm and thereby enables power to be economized.

Other objects and features of the invention will be pointed out in or will be apparent from the following description of the specific devices illustrated in the drawing, all of which relate to direction-indicators operated electromagnetically by a solenoid and plunger. In the drawing Fig. 1 is a side elevation, partly in section, of a direction-indicator embodying various features of this invention, showing the semaphore arm in signalling position;

Figs. 2 and 3 are side elevations (Fig. 2 partly in section) of part of the device of Fig. 1 illustrating different positions of the operating mechanism;

Fig. 4 is a perspective view of a part of the device, shown in section in Fig. 1;

Fig. 5 is an elevation of a part of Fig. 1, looking from the right in that figure, showing a preferred method of making electrical connection of the device to an electric power source; and Fig. 6 is a side elevation, similar to Fig. 3, of a modification of the operating mechanism.

Referring to the drawing, I preferably provide a one-piece structure, preferably a die-casting, as a carrier on which are assembled the semaphore arm 12 and the parts of the power operating means, so as to form therewith a detachable unit which can be mounted in a housing 6 which also accommodates the arm 12 when the latter is in its normal position of rest. The preferably die-cast one-piece carrier (illustrated more clearly in Fig. 4) comprises an intermediate portion 1 constituting a housing for the solenoid 29, the plunger armature of which is indicated by the reference numeral 2. The housing 1 merges at its top end into a structure, indicated generally by the reference numeral 3, with which is formed integrally an upstanding projection 4, the top end of which is recessed to form an abutment 5 which fits into a slot provided on the interior of the housing 6 and thereby serves for locating the unit, constituted by the arm 12 and operating mechanism, in the housing 6. The intermediate portion 1 merges at its bottom end into a plate 7 by means of which the unit is firmly secured in position in the housing 6. For this purpose, the latter is provided with a manually-rotatable flat-headed rivet 8 and the plate 7 is furnished with a slot 24 shaped to permit the rivet 8 to pass therethrough when the parts are in register. A half-turn of the rivet 8, so as to bring it out of register with the slot 24, secures the unit in the housing 6. A flat spring 25 fixed to the back wall of the housing 6 presses against the solenoid 29 and thereby maintains the unit firmly in position in the pocket or chamber of the carrier.

The top end structure 3 comprises a pair of spaced aligned lugs 9 by means of which the arm 12 is pivotally mounted on the one-piece carrier. Between the lugs 9 is pivoted a two-armed lever 10 to one arm 11 of which is secured the arm 12 by means of screws. The other arm 13 of the lever 10 has pivoted at its end a second two-armed lever 14 to one arm of which is pivoted the solenoid plunger 2. To the other arm of the lever 14 is attached one end of a tension spring 15, the other end of which is anchored to a projection 16 on the lever 10.

Fig. 1 shows the device with the semaphore arm 12 in its operative, signalling, position, with the solenoid 29 energized and the plunger 2 thereof drawn into the solenoid with its bottom end in contact with an adjusting screw 17 which is threaded through the bottom of the housing 1. The adjusting screw 17 enables adjustment to be made so that the arm 12 is substantially horizontal in its signalling position. In the signalling position of the arm 12, the spring 15 is unextended.

When the solenoid 29 is de-energized, the arm 12 falls under its own weight and, through the lever 14, draws the plunger 2 upwards out of the solenoid. Initial rotation of the lever 10, due to the arm 12 falling, causes the lever 14 to move at first to the left in Figs. 1–3 about the pivot between it and the plunger 2, so that thereby the spring 15 is extended. This position is illustrated in Fig. 2. Subsequently, on continued downward movement of the arm 12, the lever 14 is moved towards the right, in the figures, the spring 15 remaining extended. When the arm 12 has nearly reached its normal, vertical, position of rest, the extended spring 15 comes into play to restore itself to its normal unextended state and thereby draws the plunger 2 and arm 12 into the respective positions which they should occupy when the device is not in use. The spring 15 maintains the arm in its normal position of rest and prevents it swinging out, since any upward movement of the arm results in the spring 15 being extended and consequently it immediately seeks to restore itself to its normal unextended state. When the arm 12 is moved into signalling position by energization of the solenoid 29, the reverse movements above-described of the parts takes place. The spring 15 is again extended on initial movement of the arm 12 and remains extended until the arm normally reaches its signalling position, whereat the spring 15 comes into action to assist the solenoid in bringing the arm into its signalling position.

From Fig. 3, it will be seen that when the arm 12 is in its normal position of rest, the lever 14 and plunger 2 are mutually inclined at an angle of, or approaching, 90°. Any extraneous force, apart from the force exerted through the plunger 2 on electromagnetic actuation thereof, acting on the arm 12, due, for example, to vibration of the vehicle on which the device is mounted, will have a component directed along the lever 14. Consequently, in view of the inclination of the lever 14 to the plunger 2, no movement of the latter into the solenoid 29 can take place as a result of the action of such force component. Therefore, this arrangement of lever 14 and plunger 2 provides a simple and effective means for holding the arm 12 in its normal position against movement under the action of extraneous forces. Clearly, such holding means is released automatically when the arm 12 is to be moved to give a signal, merely as a result of the movement of the plunger 2 under power operation.

In actual manufacturing practice, by mass-production methods, it is found that slight variations exist between different samples of the same device when assembled from the separate, constituent, parts, and therefore provision is made for effecting adjustments to correct or compensate any inaccuracies present. For example, the adjusting screw 17, as hereinbefore described, is preferably provided for correcting one form of inaccuracy. Further, for compensating any play that may exist in the pivots of the arrangement constituted by the levers 10 and 14 and plunger 2, the projection 4 is preferably utilized. To this end, the parts are so constructed that the extremity 28 of the lever 14 engages, or lies very close to, the abutment surfaces of the projection 4 when the arm 12 is in its normal position. Thereby, as will be apparent, rattling of the arm 12, in the housing 6, permitted by play in the pivots above-mentioned, will be prevented.

Fig. 5 illustrates the terminal mounting for connecting the solenoid with a source of electricity. The plate 7 is provided with guides 18 (seen more clearly in Fig. 4) for receiving strips 19 and 20 (see Fig. 1) of insulating material. On the strip 20 are mounted terminals 21 and 22 which are connected together electrically by a conducting piece 32 on the underside of the strip 20, as shown in dotted lines in Fig. 5 and in section in Fig. 1. The strip 19 insulates these terminals from the metal of the plate 7. The terminal 22 receives one lead from the coil of the solenoid and one from the usual lamp (not shown) mounted within the arm 12 for illuminating the same when giving a signal. Terminal 21 is connected to one terminal of the source of electricity through the conductor 23. The circuit is completed through the metal parts of the device which, through the terminal 30 and conductor 31, is grounded upon the frame of the vehicle or, in the case of no ground return, is connected to the other terminal of the current source.

With the device so far described, it is apparent, from the description with reference to Fig. 3, that the arm 12 cannot be moved away from its normal, hanging, position unless the solenoid is energized. As has already been stated, it is desirable to be able to lift the arm by hand independently of operation by the solenoid. A simple and effective means for accomplishing this purpose, while at the same time holding the semaphore arm at rest against vibration, is illustrated in Fig. 6. This figure is a view similar to Fig. 3 and illustrates the parts when the arm 12 is in normal position. The construction of the device of Figs. 1 to 3 is modified such that the lever 14, in the normal position, is inclined to the plunger 2 at less than 90° so that any force applied through this lever from the right in the figure will have a component acting downwards upon the plunger 2. The mutual inclination of the lever 14 and plunger 2 can be so arranged, by careful construction, that these parts offer, on the one hand, sufficient resistance to forces arising in lever 14 due to vibration, as to hold the arm 12 in normal position against such forces; while, on the other hand, such resistance is insufficient to prevent the arm being forcibly raised by hand, once such resistance has been overcome. However, the necessary careful construction may be considered to be out of the question when the device is being manufactured by mass-production methods and therefore I have found that the desired result can be obtained, with a mass-produced device, having a little play in the pivots (see the foregoing description with reference to Fig. 3), if the projection 4 is provided, having an inclined surface 27 adjacent the extremity 28 of the lever 14. The projection 4 is shown in dotted lines in Fig. 5, but this is merely to emphasize that this is not absolutely essential for the proper working of the holding and releasing means, if the parts are constructed with care. However, as I prefer to provide the projection 4, in any case, for fixing the unit in the housing 6, I find it convenient to use this projection, at the same time, for the additional purpose described.

My invention will now be clearly understood from the foregoing description and the accompanying drawing, and while I have shown the constructions preferred, I do not wish to be limited to the exact details described and shown, except insofar as I limit myself by the appended claims. For instance, while I have shown my invention as applied to indicators operated electromagnetically, it is clear that some at least of the features thereof may be embodied in indicators operated pneumatically. Also, I have shown the indicator provided with a housing 6 of its own which is secured to the vehicle, but clearly the unit, comprising the arm and operating means, can equally well be fitted directly into the coachwork of the vehicle, without a separate housing.

I claim:

1. A vehicle direction indicator comprising a casing, a carrier body comprising a central channel portion housing a solenoid, a pivoted arm supported by said body at one end thereof, attaching means at said end for engaging cooperating supporting means within said casing, attaching means projecting at the other end of said carrier body for engaging cooperating supporting means in said casing, supporting means on said attaching means for devices by which said solenoid may be connected to an electric current source, an armature controlled by said solenoid, and a link mechanism between said armature and said pivoted arm whereby said arm is operated under control of said solenoid.

2. A vehicle direction indicator comprising a casing, a carrier body within said casing, said carrier body comprising a central channel portion housing a solenoid, means at both ends of said carrier body and engaging cooperative parts provided in said casing to retain said carrier body in position therein, a signalling arm pivoted on one end of said carrier body, supporting means on a part at the other end of said body for a terminal strip, connections from terminals on said terminal strip to said solenoid, a core cooperating with said solenoid, and a link mechanism between said arm and said core whereby said arm may be raised by said core under action of said solenoid, said link mechanism comprising a spring operating on said pivoted arm to assist elevation thereof to the signalling position.

3. A vehicle direction indicator comprising a casing, a carrier body within said casing, said carrier body comprising a central channel portion housing a solenoid, ears projecting forwardly and upwardly at one end of said carrier body, a signalling arm pivoted between said ears, a projection on said carrier body located centrally between and behind said ears, a catch in the top of said casing adapted to receive the upwardly directed free end of said projection, an armature moving within said solenoid, a link connecting said armature with the rearward end of said signalling arm, said projection engaging the rearward end of said link in the in-operative position thereof, and attaching means at the reverse end of said carrier body for engaging cooperating supporting means in said casing for supporting said body therein and supporting means for terminals for the connection of an electric current source.

4. In a vehicle direction indicator a mechanism as claimed in claim 3, wherein the link between the solenoid armature and the signalling arm projects forwardly beyond the pivot connecting same to the signal arm and has a tension spring connecting the forward end of said link to a hook on said signalling arm.

5. A vehicle direction indicator mechanism as claimed in claim 3, wherein the projection on said carrier body comprises an abutment against which said link rests in the normal position of rest of the signalling arm, whereby said link and the armature of said solenoid are maintained at a mutual inclination less than 90°, whereby said arm is held in its inoperative position against movement by vibration while being freely movable under the action of the solenoid armature and movable forcibly by hand independently of said solenoid armature.

BRUNO JABLONSKY.